(12) United States Patent
Weng (10) Patent No.: US 7,256,987 B2
(45) Date of Patent: Aug. 14, 2007

(54) AUTOMATIC HOMING APPARATUS OF A ROTATABLE MODULE

(75) Inventor: Shih-Lung Weng, Kaohsiung (TW)

(73) Assignee: Benq Corporation, Taoyuan Shien (TW)

( * ) Notice: Subject to any disclaimer, the term of this patent is extended or adjusted under 35 U.S.C. 154(b) by 320 days.

(21) Appl. No.: 10/888,880

(22) Filed: Jul. 9, 2004

(65) Prior Publication Data

US 2005/0073155 A1    Apr. 7, 2005

(30) Foreign Application Priority Data

Jul. 28, 2003   (TW) ............................... 92120575 A (51) Int. Cl.
*H05K 5/00*    (2006.01)
(52) U.S. Cl. ................... 361/683; 361/681; 348/207.1; 348/375; 292/138
(58) Field of Classification Search ............. 348/207.1, 348/375; 361/681, 683; 292/138
See application file for complete search history.

(56) References Cited

U.S. PATENT DOCUMENTS 5,801,919 A * 9/1998 Griencewic ................. 361/683
6,530,784 B1 * 3/2003 Yim et al. .................... 439/31
6,587,151 B1 * 7/2003 Cipolla et al. .............. 348/373
6,847,520 B2 * 1/2005 Hashimoto .................. 361/680
6,933,981 B1 * 8/2005 Kishida et al. ............. 348/375
6,957,083 B2 * 10/2005 Ikeda et al. .............. 455/556.1
7,061,536 B2 * 6/2006 Cha ........................... 348/376
2005/0168566 A1 * 8/2005 Tada et al. ............... 348/14.01

* cited by examiner

*Primary Examiner*—Jayprakash Gandhi
*Assistant Examiner*—Ingrid Wright
(74) *Attorney, Agent, or Firm*—Thomas, Kayden, Horstemeyer & Risley (57) ABSTRACT

An automatic homing apparatus of a rotatable module applied to a foldable device. The foldable device includes a first casing and a second casing. The automatic homing apparatus includes a fastener, a pivot, and a transmission mechanism. The fastener is for fastening the first casing and the second casing. The pivot is for pivotally connecting the rotatable module to the first casing. The transmission mechanism is disposed at one end of the pivot. When the first casing is fastened to the second casing, the transmission mechanism is actuated by the fastener so that the pivot drives the rotatable module to turn for homing.

24 Claims, 7 Drawing Sheets

AUTOMATIC HOMING APPARATUS OF A ROTATABLE MODULE

This application claims the benefit of Taiwan application Ser. No. 092120575, filed Jul. 28, 2003, the subject matter of which is incorporated herein by reference.

BACKGROUND OF THE INVENTION

1. Field of the Invention

The invention relates in general to an automatic homing apparatus, and more particularly to an automatic homing apparatus of a rotatable module.

2. Description of the Related Art

Featured with prompt and instant image processing, digital still cameras (DSC) are experiencing a strong growth in market demand and have gained a great popularity. Following the mainstream trend of integrating computer communication appliances with electronic consumer products, it has become a new trend to build a camera in portable electronic products, such as mobile phones, PDAs, and notebooks.

Normally, the built-in digital still camera of a foldable device is disposed at the front end of the pivot or at the cover of the foldable device. Referring from FIG. 1A to FIG. 1C, side views of a built-in digital still camera of a foldable device are shown. The foldable device includes a cover 110, a body 120, and an axle 130. The axle connects the cover 110 and the body 120 so that the cover 110 can be closed or opened relative to the body 120. The digital still camera 100 is rotatably coupled to the front end of the cover 110 via the pivot 104 to enlarge the view scope of the lens 102.

Figure 1A:
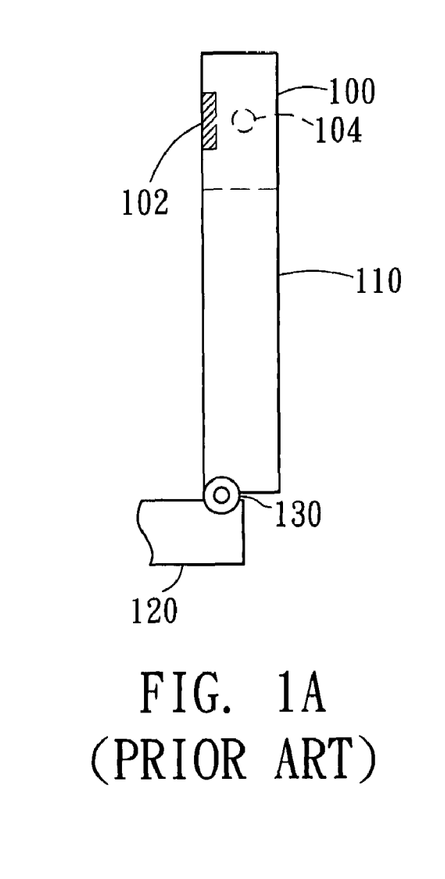
FIG. 1A to FIG. 1C (Prior Art) are side views of a built-in digital still camera of a foldable device.
Figure 1B:
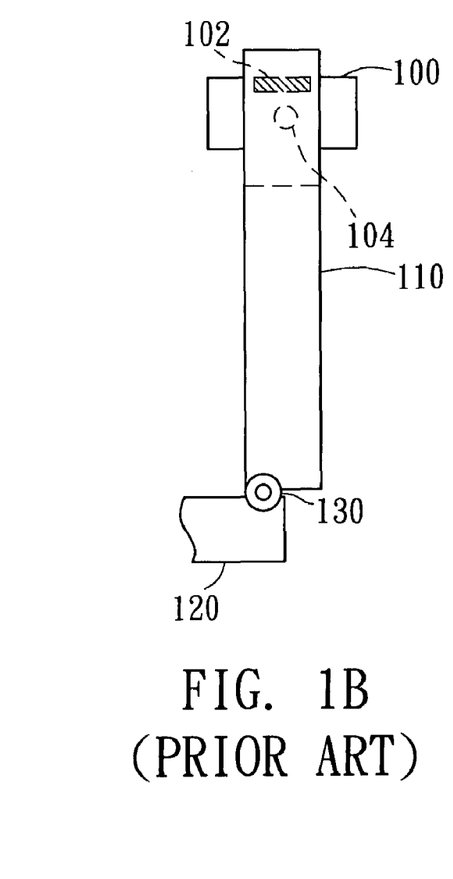
Figure 1C:
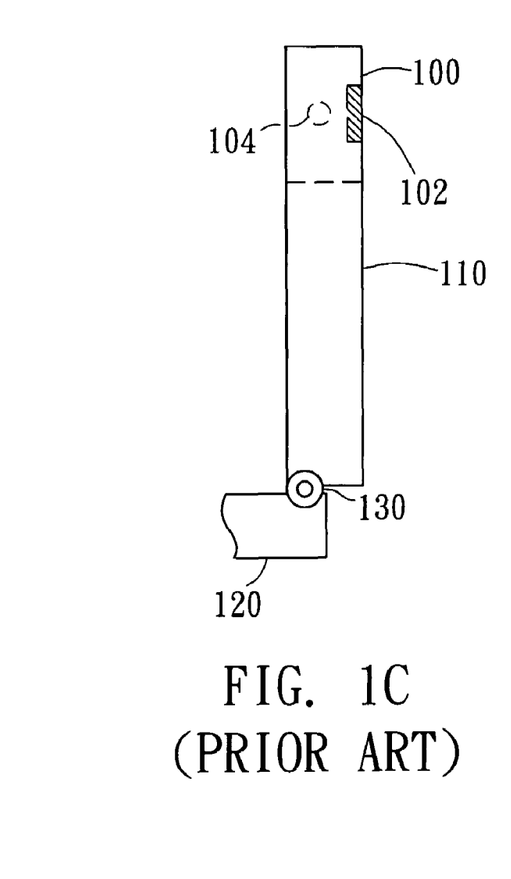

As shown in FIG. 1A, the digital still camera 100 is at the initial status without any rotation wherein the digital still camera 100 has a 0-degree angle of rotation corresponding to the cover 110. The digital still camera 100 has a 90-degree angle of rotation corresponding to the cover 110 as shown in FIG. 1B while the angle of rotation between the digital still camera 100 and the cover 110 is 180 degrees as shown in FIG. 1C. The angle of rotation of the digital still camera 100 can be any angle between 0 and 180 degrees. When taking photos, a user can adjust the lens 102 to an optimal angle. However, after rotation, the digital still camera 100 will collide or interfere with the body 120 if the digital still camera 100 fails to return to 0 degree or rotate to 180 degrees before the cover 110 is closed to the body 120.

SUMMARY OF THE INVENTION

It is therefore an object of the invention to provide an automatic homing apparatus of a rotatable module, which actuates the rotatable module to turn for homing via the elements of the foldable device, hence avoiding the collision or interference between the rotatable module and the body of the foldable device.

It is therefore an object of the invention to provide an automatic homing apparatus installed in a foldable device, wherein the foldable device includes a first casing and a second casing. The rotatable automatic homing apparatus includes a rotatable module, a pivot, a transmission mechanism and an actuating element. The rotatable module is rotatably coupled onto the first casing. The pivot, which is disposed at two lateral sides of the rotatable module, pivotally connects the rotatable module to the first casing. The transmission mechanism is disposed at one end of the pivot. The actuating element has a contact end for actuating the transmission mechanism so that the pivot is driven to rotate and accordingly drive the rotatable module to turn for homing when the first casing and the second casing are closed together.

It is therefore an object of the invention to provide an automatic homing apparatus applied in a foldable device, wherein the foldable device includes a first casing and a second casing. The automatic homing apparatus includes a fastening mechanism, a pivot and a transmission mechanism. The fastening mechanism is for fastening the first casing to the second casing. The pivot pivotally connects the rotatable module to the first casing. The transmission mechanism is disposed at one end of the pivot. When the first casing and the second casings are closed together, the rotatable module will be actuated by the fastening mechanism so that the pivot will drive the rotatable module to turn for homing.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 2:
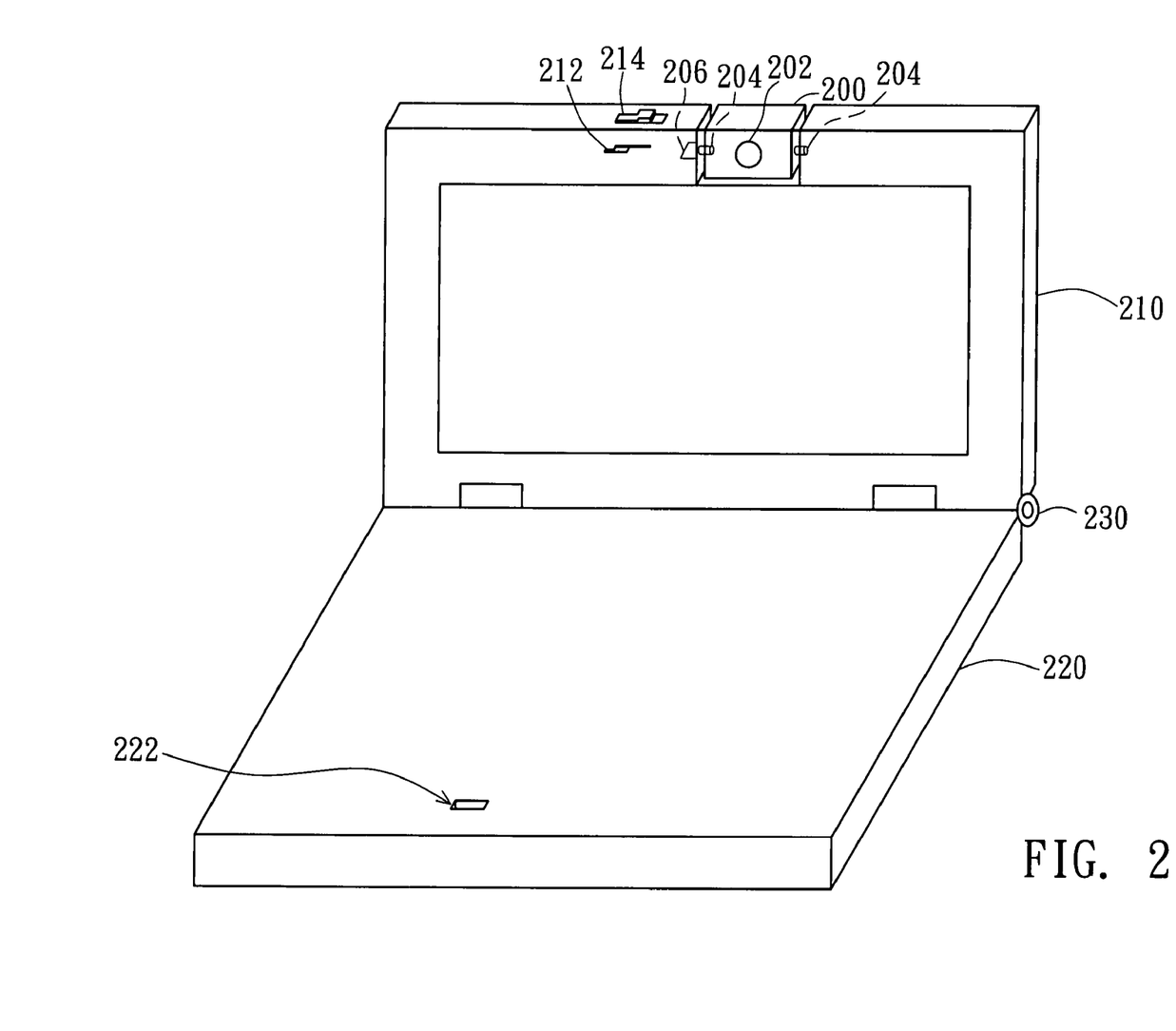
FIG. 2 is a schematic diagram showing an automatic homing apparatus for a digital still camera according to a preferred embodiment of the invention.

Referring first to FIG. 2, a schematic diagram showing an automatic homing apparatus for a digital still camera according to a preferred embodiment of the invention. The automatic homing apparatus for the digital still camera according to a preferred embodiment of the invention is applied in a notebook computer. The notebook computer includes a cover 210 (first casing), a body 220 (second casing) and an axle 230. The axle 230 which connects the cover 210 and the body 220 allows the cover 210 to be closed to or opened relative to the body 220 via rotary movements. As shown in FIG. 2, the cover 210 is a liquid crystal display (LCD) whereas the body 220 is the body of a notebook computer. The automatic homing apparatus for digital still camera includes a fastening mechanism, a pivot and a transmission mechanism. The fastening mechanism includes a hole 222 and a hook 212, wherein the hole 222 is situated at the front end of the body 220 while the hook 212 is moveably disposed at the front end of the cover 210. The pivot 204 is disposed at two lateral sides of the digital still camera 200. The digital still camera 200, which is built in a foldable device, is rotatably coupled to the front end of the cover 210 via the axle 204 to enlarge the view scope of the camera. The transmission mechanism, which is disposed at one end of the axle 204, is the spiral bevel 206.

When the cover 210 is closed relative to the body 220, the hook 212 tightly fits into the hole 222. When the user pushes the button 214 to release the hook 212 from the hole 222, the cover 210 is opened relative to the body 220.

Figure 3A:
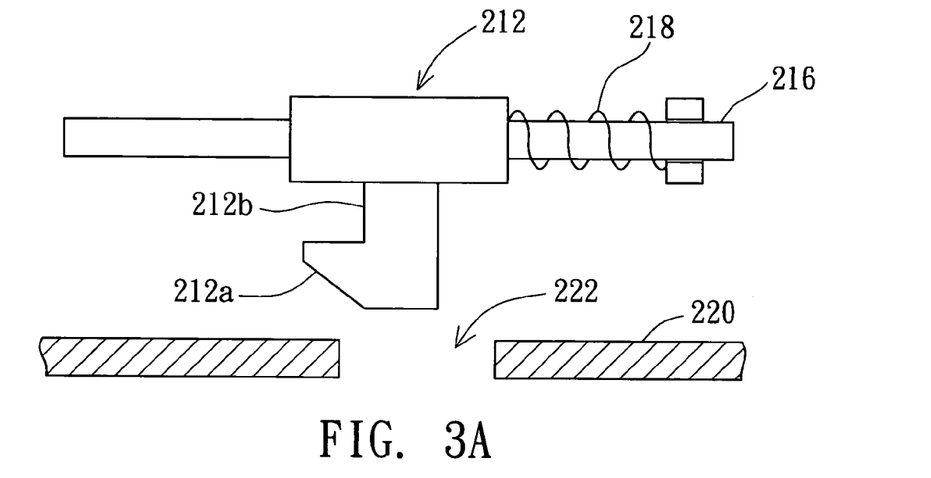
FIG. 3A to FIG. 3C are schematic diagrams showing the movements of a fastening mechanism illustrated in FIG. 2.
Figure 3B:
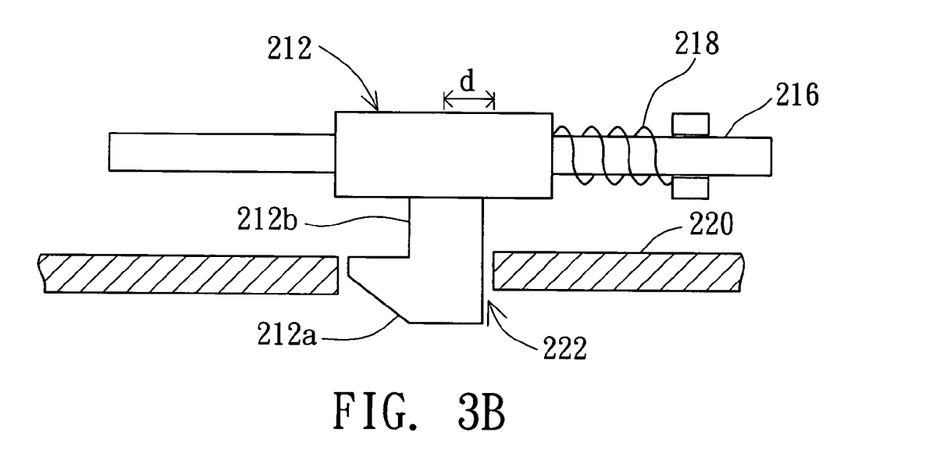
Figure 3C:
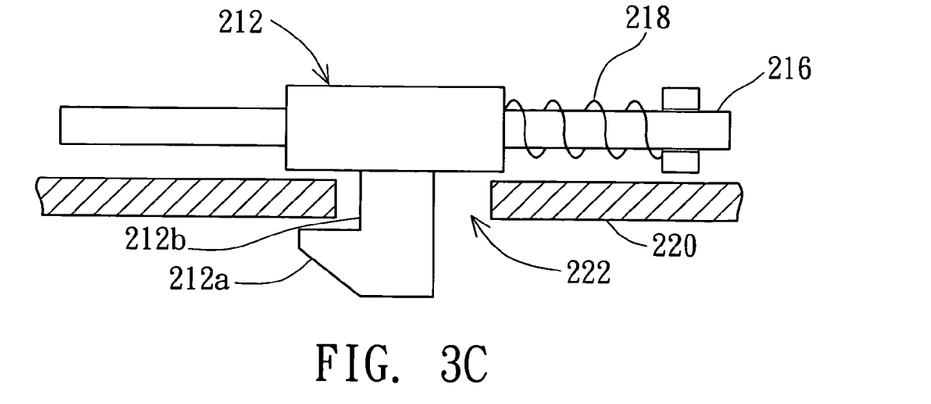

Referring to FIG. 3A to FIG. 3C, schematic diagrams show the movements of a fastening mechanism illustrated in FIG. 2. The fastening mechanism includes a slide bar 216 and a spring 218, wherein the slide bar 216 disposed at a lateral side of the hook 212 is winded with the spring 218. The hook 212 includes a guiding section 212a and a hooking section 212b. The guiding section 212a guides the hook 212 into the hole 222 so that the hooking section 212b can be fastened onto a side wall of the hole 222. The guiding section 212a can be a spiral bevel, an arc surface or a chamfer.

In FIG. 3A, as the cover 210 is closing towards the body 220, the hook 212 also approaches the hole 222. Next, referring to FIG. 3B, the guiding section 212a guides the hook 212 into the hole 222 so that the hook 212 moves towards the right, creating a maximum shift of d and compressing the spring 218 at the same time. In FIG. 3C, when the hook 212 completely fits into the hole 222, the hooking section 212b will be fastened onto a side wall of the hole 222. In the meantime, the elasticity force provided by the spring 218 moves the hook 212 towards the left to tightly fit into the hole 222, hence the cover 210 can be firmly fastened to the body 220.

Figure 4:
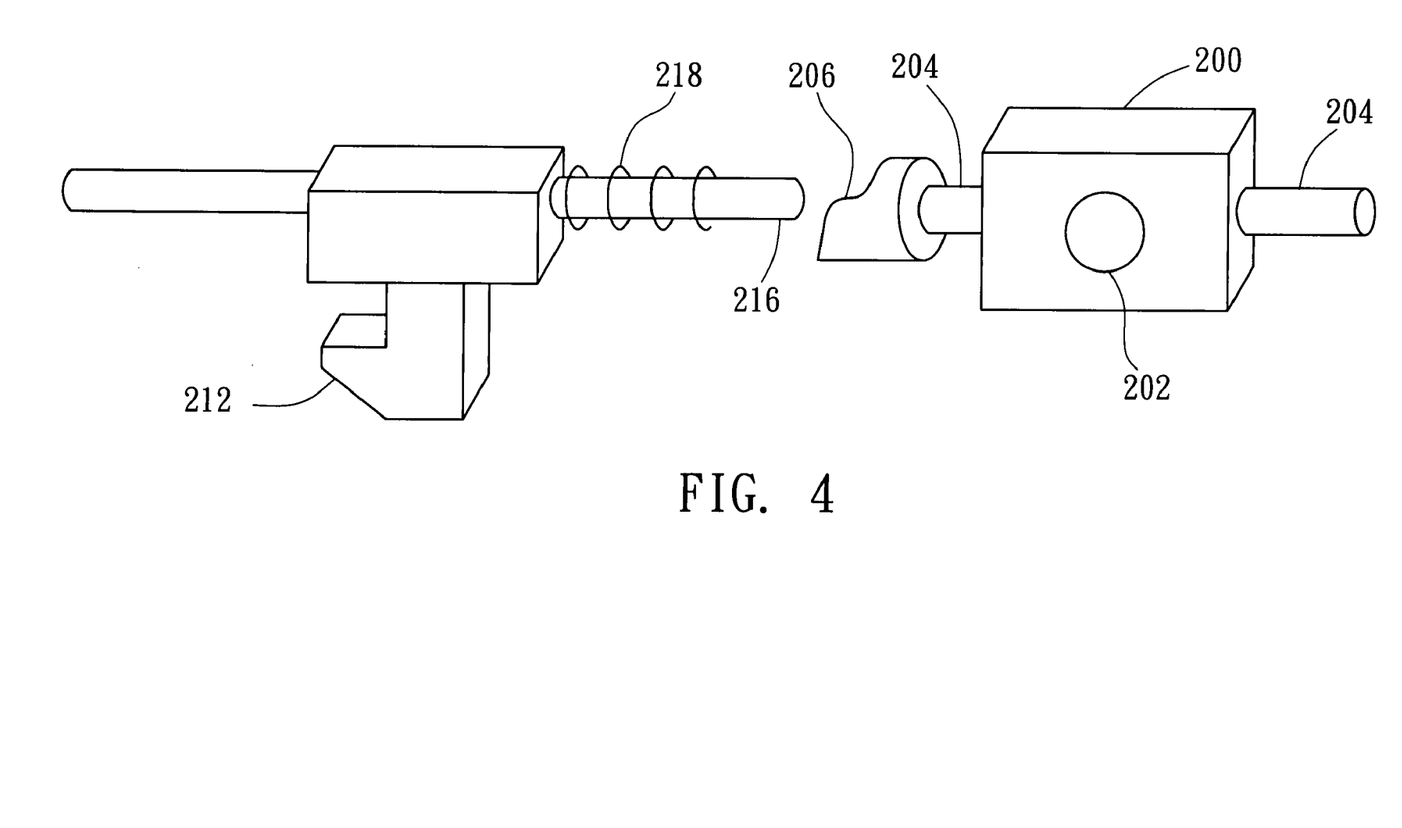
FIG. 4 is a three-dimensional diagram of a rotatable automatic homing apparatus according to a preferred embodiment of the invention.

Referring to FIG. 4, a three-dimensional diagram of a rotatable automatic homing apparatus according to a preferred embodiment of the invention. The rotatable automatic homing apparatus includes a digital still camera 200, a pivot 204, a spiral bevel 206 and an actuating element. The actuating element generates actuation and causes the digital still camera 200 to rotate. The actuating element has a contact end. When the actuating element moves to the spiral bevel 206, the contact end actuates the spiral bevel 206 and slides therealong, causing the pivot 204 to rotate and drive the digital still camera 200 to turn for homing. As shown in FIG. 4, when the digital still camera 200 is installed in a foldable device which is disposed at the front end of the cover 210, the actuating element can be the hook 212 of the fastening mechanism while the contact end can be the slide bar 216 winded with the spring 218.

Figure 5A:
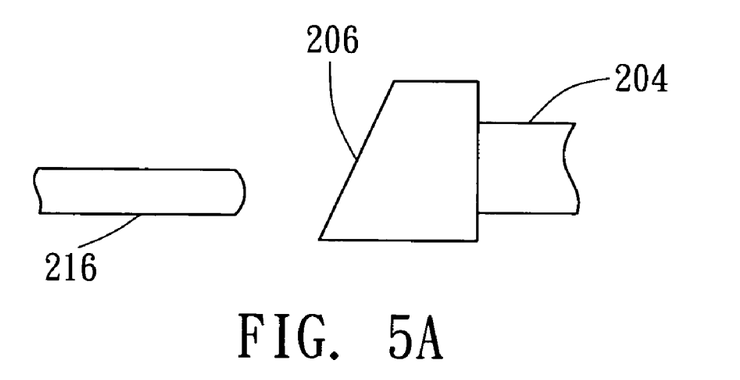
FIG. 5A to FIG. 5C are diagrams showing the movements of a transmission mechanism illustrated in FIG. 4.
Figure 5B:
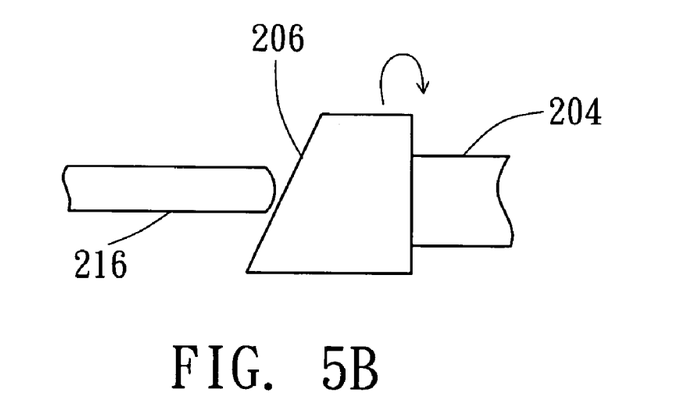
Figure 5C:
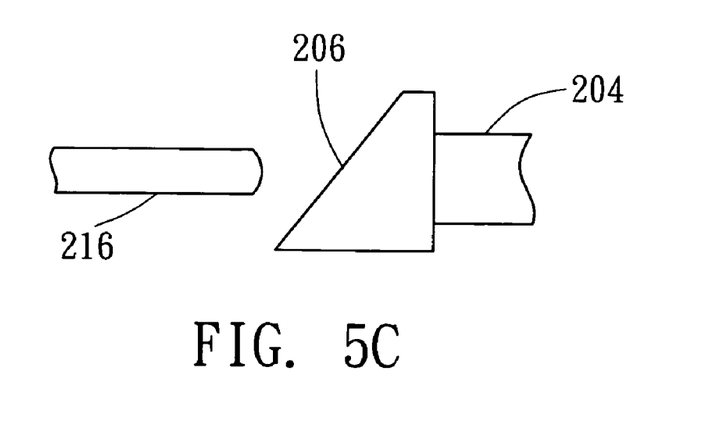

Referring from FIG. 5A to FIG. 5C, diagrams show the movements of a transmission mechanism illustrated in FIG. 4. Further referring from FIG. 3A to FIG. 3C, diagrams show the corresponding figures of FIG. 5A to FIG. 5C. In FIG. 3A and FIG. 5A, when the cover 210 is closed relative to the body 220, the hook 212 gradually approaches the hole 222. Meanwhile, the rotated digital still camera 100, has not yet returned to homing position. In FIG. 3B and FIG. 5B, the hook 212 moves to the right and actuates the spiral bevel 206, causing the slide bar 216 to slide along the spiral bevel 206 such that the pivot 204 rotates and drives the digital still camera 200 to turn for homing as shown in FIG. 5C. In FIG. 3C and FIG. 5C, the elasticity force provided by the spring 218 causes the hook 212 to move to the left and leave the spiral bevel 206.

Figure 6A:
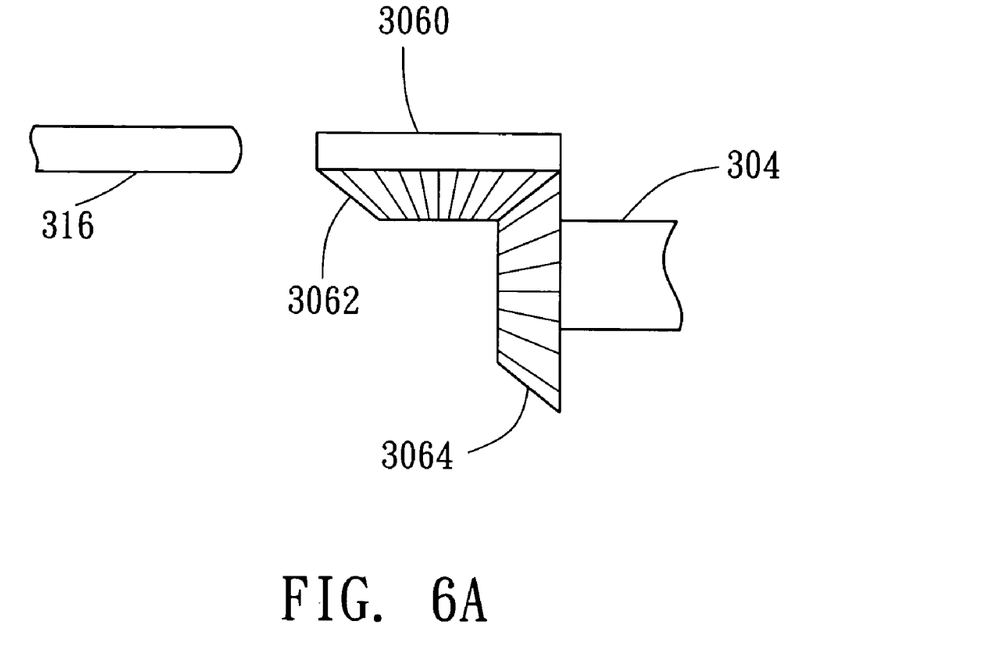
FIG. 6A is a diagram of a transmission mechanism according to another embodiment of the invention.
Figure 6B:
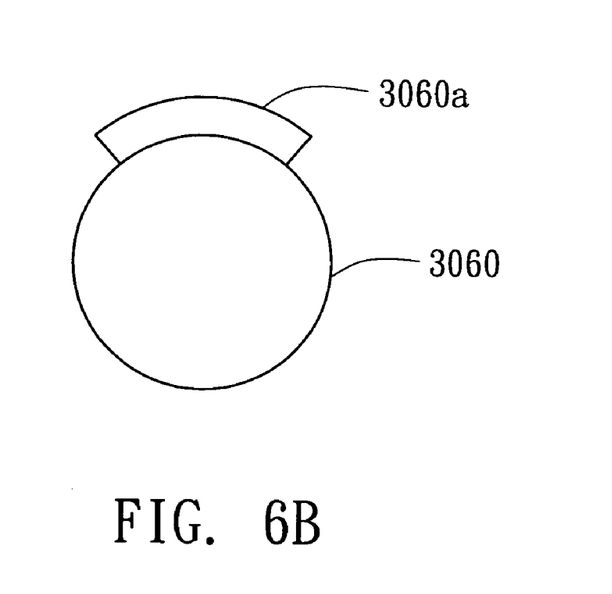
FIG. 6B is a top view of a first gear illustrated in FIG. 6A.

Referring to FIG. 6A, a diagram of a transmission mechanism according to another embodiment of the invention is shown. The transmission mechanism of the rotatable automatic homing apparatus according to the invention can be a gear set. The gear set as shown in FIG. 6A includes the first gear 3060, the second gear 3062 and the third gear 3064. The first gear 3060 is coaxially coupled to the second gear 3062 while the third gear 3064 is coaxially coupled to the pivot 304. The second gear 3062 is engaged with the third gear 3064. FIG. 6B shows a top view of the first gear illustrated in FIG. 6A. The first gear 3060 has a tooth section 3060a protruding from the partial rim of the first gear 3060. The arc range of the partial rim is determined according to the maximum angle of rotation of the rotatable module. A tooth section is disposed at the opposite side of the slide bar 316. When the gear set is actuated by the fastening mechanism, the tooth section of the slide bar 316 is coupled to the tooth section 3060a of the first gear 3060 so that the gear set is driven to rotate accordingly. The first gear 3060 and the second gear 3062 rotate coaxially. The second gear 3062 drives the third gear 3064 to rotate so that the pivot 304 is driven to rotate accordingly. Hence, the gear set indirectly drives the rotatable module to turn for homing.

The automatic homing apparatus of the digital still camera disclosed in the above embodiments of the invention combines the fastening mechanism of the foldable device with the built-in design of the digital still camera. Without using any extra parts or elements, the actuation for the rotatable homing of the digital still camera can be provided, avoiding the collision or interference between the digital still camera and the notebook computer when the cover and the body are closed together.

The automatic homing apparatus of the digital still camera disclosed in the above embodiments of the invention is illustrated by example of the digital still camera disposed at the cover. However, the invention also allows modifications and adjustments to be included therein. For instance, the digital still camera can be disposed at the body provided that minor adjustments of parts and elements are made to provide actuation for rotatable homing of the digital still camera, avoiding the collision or interference between the digital still camera and the notebook computer when the cover and the body are closed together. Such design can be achieved by incorporating minor adjustments into above preferred embodiments without further detail descriptions.

Figure 7:
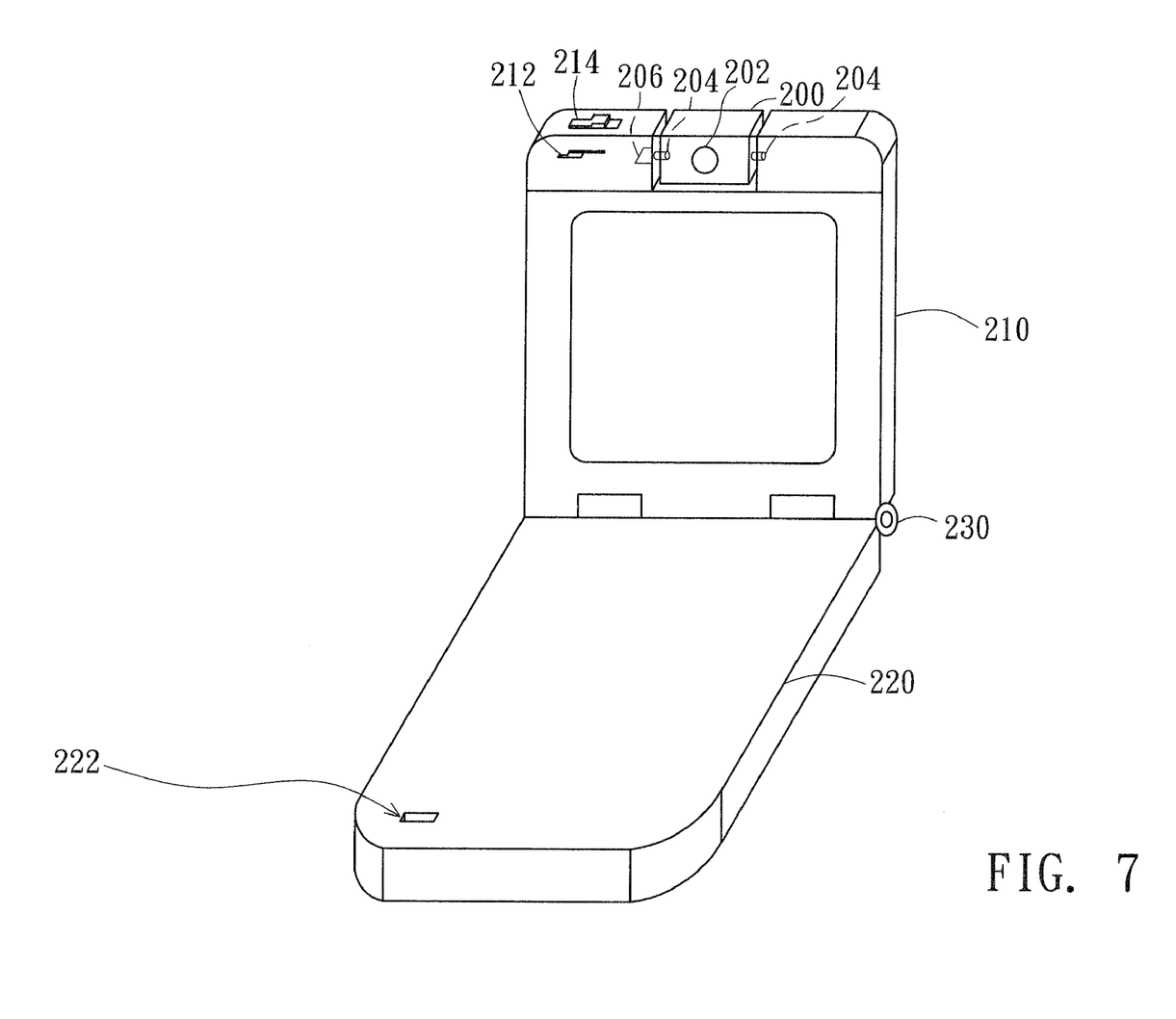
FIG. 7 is a schematic diagram showing an automatic homing apparatus for a mobile phone according to an embodiment of the invention.

Although the automatic homing apparatus of the digital still camera disclosed in the above embodiments of the invention uses a digital still camera as a preferred embodiment, it is to be understood that the application of the invention is not limited to digital still camera. For example, the homing apparatus could be a mobile phone, as illustrated in FIG. 7. Any built-in rotatable module of a foldable device can use the rotatable automatic homing device according to the invention to have an automatic homing function. The foldable device can be a notebook, a mobile phone or other foldable devices with the fastening mechanism, while the rotatable module can be a digital still camera, a liquid crystal module (LCM) or other built-in elements which can rotate around the foldable device.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A rotatable automatic homing apparatus installed in a foldable electronic device, wherein the foldable device includes a first casing and a second casing, the rotatable automatic homing apparatus comprising:
   a rotatable module rotatably coupled onto the first casing;
   a pivot disposed at two lateral sides of the rotatable module for pivotally connecting the rotatable module to the first casing;
   a transmission mechanism disposed at one end of the pivot; and
   an actuating element which has a guiding section protruded from the first casing and a contact end, wherein when the first casing and the second casing are closed, the guiding section touches the second casing so as to move the contact end to actuate the transmission mechanism to rotate the pivot and accordingly drives the rotatable module to turn for homing.

2. The rotatable automatic homing apparatus according to claim 1, wherein the actuating element is a hook movably disposed at the first casing.

3. The rotatable automatic homing apparatus according to claim 2, wherein the second casing has a hole for accommodating the hook so that the first casing can be firmly fastened onto the second casing.

4. The rotatable automatic homing apparatus according to claim 3, wherein the contact end is a slide bar disposed at one end of the hook.

5. The rotatable automatic homing apparatus according to claim 1, wherein the transmission mechanism is a spiral bevel onto which the actuation element is movably coupled, allowing the contact end to slide along the spiral bevel when the first casing and the second casing are closed together.

6. The rotatable automatic homing apparatus according to claim 3, wherein the rotatable automatic homing apparatus further comprises:
   a spring, disposed onto the slide bar, providing an elasticity force so that the hook tightly fits into the hole.

7. The rotatable automatic homing apparatus according to claim 3, wherein the guiding section guides the hook into the hole.

8. The rotatable automatic homing apparatus according to claim 1, wherein the first casing is a liquid crystal display (LCD).

9. The rotatable automatic homing apparatus according to claim 8, wherein the foldable electronic device is a notebook computer.

10. The rotatable automatic homing apparatus according to claim 8, wherein the foldable electronic device is a mobile phone.

11. The rotatable automatic homing apparatus according to claim 1, wherein the rotatable module is a digital still camera.

12. The rotatable automatic homing apparatus according to claim 1, wherein the rotatable module is a liquid crystal module (LCM).

13. A foldable electronic device, comprising:
   a first casing and a second casing;
   a fastening mechanism for fastening the first casing to the second casing, wherein the fastening mechanism includes an actuating element with a guiding section protruded from the first casing and a contact end;
   a rotatable module;
   a pivot for pivotally connecting the rotatable module to the first casing;
   a transmission mechanism which is disposed at one end of the pivot, wherein when the first casing and the second casing are closed, the guiding section touches the second casing so as to move the contact end to actuate the transmission mechanism to rotate the pivot and accordingly drives the rotatable module to turn for homing.

14. The foldable electronic device according to claim 13, wherein the foldable electronic device further comprises:
   a hole situated at the second casing; and
   the actuating element being a hook movably disposed at the first casing, for tightly fitting into the hole.

15. The foldable electronic device according to claim 14, wherein the foldable electronic device comprises:
   a slide bar disposed at one end of the hook.

16. The foldable electronic device according to claim 15, wherein the transmission mechanism is a spiral bevel along which the slide bar slides when the spiral bevel is actuated by the fastening mechanism.

17. The foldable electronic device according to claim 15, wherein the automatic homing apparatus further comprises:
   a spring, disposed onto the slide bar, providing an elasticity force so that the hook tightly fits into the hole.

18. The foldable electronic device according to claim 14, wherein the guiding section guides the hook into the hole.

19. The foldable electronic device according to claim 13, wherein the first casing is a liquid crystal module (LCM).

20. The foldable electronic device according to claim 19, wherein the foldable electronic device is a notebook computer.

21. The foldable electronic device according to claim 19, wherein the foldable electronic device is a mobile phone.

22. The foldable electronic device according to claim 13, wherein the rotatable module is a digital still camera.

23. The foldable electronic device according to claim 1, wherein when the first casing and the second casing are opened, the rotatable module is freely rotatable with respect to the first casing.

24. The foldable electronic device according to claim 13, wherein when the first casing and the second casing are opened, the rotatable module is freely rotatable with respect to the first casing.

* * * * *